United States Patent Office 2,950,282
Patented Aug. 23, 1960

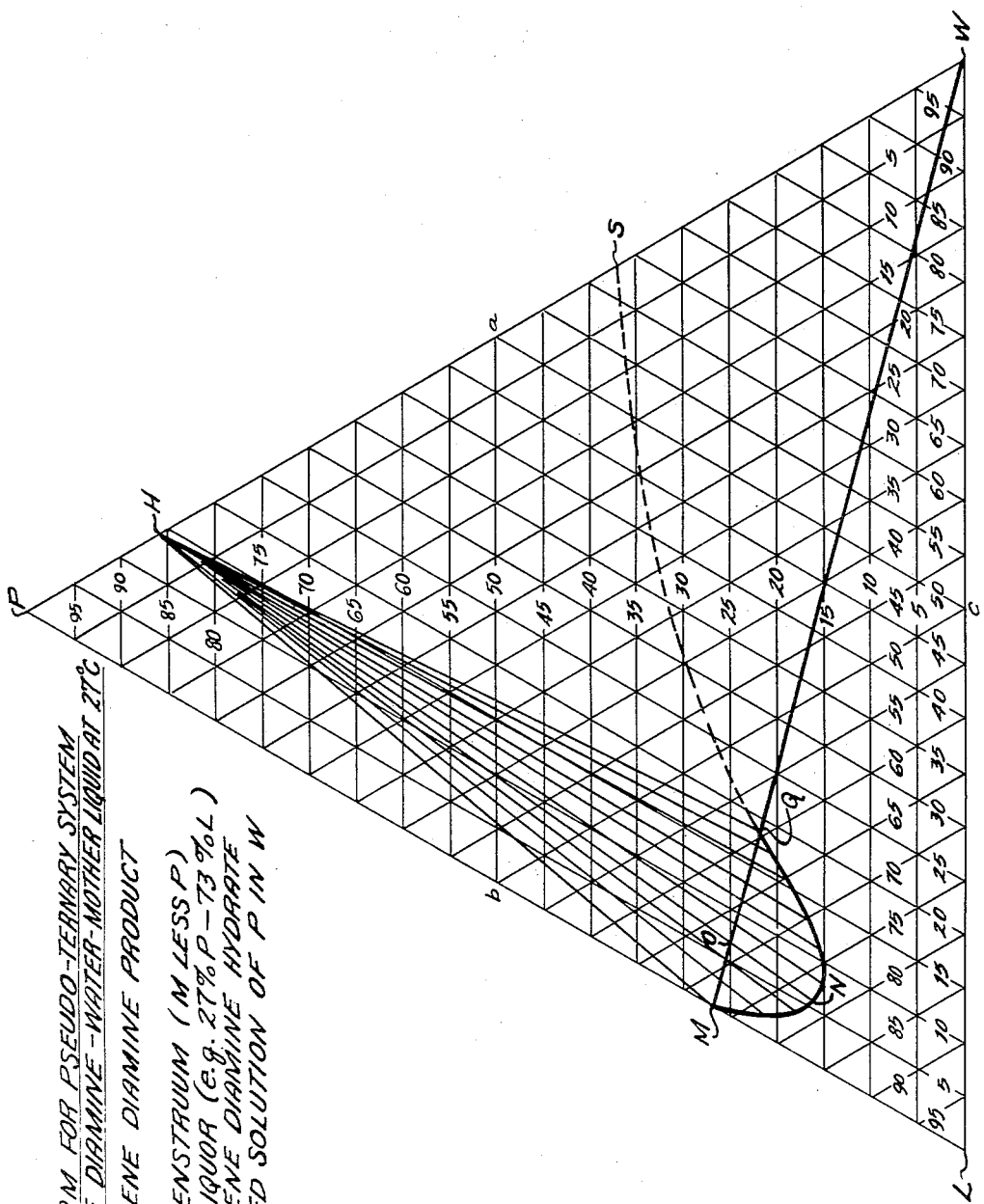

2,950,282

METHOD FOR SEPARATION AND RECOVERY OF DIAZABICYCLO-OCTANE

Adalbert Farkas, Media, Pa., assignor to Houdry Process Corporation, Wilmington, Del., a corporation of Delaware Filed Nov. 6, 1958, Ser. No. 772,306

7 Claims. (Cl. 260—268)

This invention relates to a method for the separation and recovery of 1,4-diazabicyclo-(2.2.2)-octane, also known and hereinafter referred to as triethylene diamine, from reaction products and the like containing the same. The invention is particularly concerned with improved techniques for the separation and recovery of such triethylene diamine in relatively high yields as a product of acceptable purity suitable for commercial uses.

Triethylene diamine has heretofore been obtained from various reaction products derived from chemical reactions involving readily available materials. While the presence of relatively small amounts of triethylene diamine had earlier been reported as being found in certain reaction products, the art had not as readily disclosed simple and efficient methods for recovery of the product which would warrant commercial adoption.

More recently, efficient methods have been developed for the preparation of triethylene diamine, as disclosed, for example, in copending U.S. application Serial Number 628,723 of Elbert C. Herrick, filed December 17, 1956, for preparation of Diazabicyclo-Octane. The method disclosed in said copending application involves the vapor phase reaction of an alkylene polyamine, such as diethylene triamine, over a solid acidic catalyst at temperatures in the range of about 300 to 500° C., the desired triethylene diamine being obtained with accompanying production of piperazine. Herrick discloses several alternative methods for obtaining, by suitable known distillation treatment, a reaction product fraction boiling in the range of about 150 to 190° C., which fraction may contain approximately 45 to 55% by weight of triethylene diamine. In what is stated to be a preferred operation, an even narrower cut may be obtained by further distillation treatment to produce a fraction boiling in the range of about 168 to 175° C. Alternatively, however, a much wider cut of still bottoms having a substantially lower triethylene diamine concentration may be obtained by employing a less precise fractionation of the reaction products, and such wider cut may then provide the fraction from which separation and recovery of triethylene diamine may be obtained. In such case, however, the recovered product will not be as clean as when the recommended multiple distillation procedure is followed.

The present invention is concerned with the efficient recovery of substantially pure triethylene diamine from a so-called triethylene diamine fraction, regardless of the procedure by which such fraction is obtained.

According to a procedure disclosed in the aforesaid copending application of Elbert C. Herrick, Serial No. 628,723, a triethylene diamine fraction is obtained from the fractionator and is cooled so as to effect a crystallization of triethylene diamine. Such cooling treatment results in a mixture of crystalline and liquid products. The crystalline product is then separated from the liquid product by any suitable known means, and is subsequently purified by successive washings with pentane. Trituration and filtration are effected in each contact stage, the final triethylene diamine product being a colorless crystalline solid which normally is better than 95% pure.

The mother liquor, which may form the charge or starting material of the present process, is desirably, though not necessarily, limited to the liquid from which triethylene diamine is initially crystallized. That is, it comprises the residual liquor after the first crystals are separated from the triethylene diamine concentrate. While the pentane wash (or extract) could be combined with the mother liquor, it is not practical to do so, since the wash is relatively poor in triethylene diamine and related amines.

While the crystalline triethylene diamine obtained in the foregoing manner is sufficiently pure (95+%) for many commercial uses of the product, it is contemplated that in some cases a product of higher purity may be desired. In such case, it has been suggested that the crystalline triethylene diamine be further purified (99.9+%) by various known procedures, such as sublimation, recrystallization, or redistillation.

In a present practice, triethylene diamine is recovered by crystallization from a distillation cut boiling in the range of 160 to 195° C., the remaining mother liquor containing about 18 to 28% triethylene diamine, dependent upon the temperature of crystallization. Additional amounts of triethylene diamine may then be recovered from the mother liquor by any of several procedures, such as by lowering its temperature substantially below atmospheric, by redistillation, or by recycling it with a subsequent distillation charge. It has been found, however, that none of these methods for obtaining additional recovery of triethylene diamine is completely satisfactory, either because of incomplete recovery of the triethylene diamine contained in the mother liquor or because of the complexity or expensive nature of the operations involved. It is therefore a principal object of the present invention to achieve an efficient and more complete recovery of additional triethylene diamine from a mother liquor with a minimum of treating operations and at a cost which will render the separation and recovery procedure practical for commercial use.

Experimental investigation has shown that by adding to the mother liquor small amounts of water (in the range of about 3 to 10% by weight) up to about 55% of the triethylene diamine contained in the mother liquor can be precipitated in the form of a hydrate, either the monohydrate or dihydrate. It was found also that precipitation of triethylene diamine occurred when the mother liquor was diluted with a light paraffinic hydrocarbon, such as, petane, hexane, iso-octane, etc., but that no precipitate was formed when benzene, toluene, xylene, or chloroform was used. Furthermore, when pentane was initially added to the mother liquor, the further addition of a relatively large amount of water, as for example the addition of 20–100 wt. percent of water (based on the mother liquor) to a half-and-half mixture of mother liquor and pentane, resulted in the formation of an aqueous layer in the final mixture, but no precipitation occurred. Apparently, any hydrate which was formed had become dissolved in the excess water.

In accordance with the present invention, a relatively small amount of water is added to the mother liquor, approximately in the ratio of one to two mols of water to one mole of the triethylene diamine. Since the mother liquor possibly contains 15–30 wt. percent, but more likely about 18–28 wt. percent, of triethylene diamine, the amount of water required to produce the hydrate will not exceed 10 wt. percent based on the mother liquor, and more likely be in the order of about 4.0 to 7.5 wt. percent, dependent upon the triethylene diamine content of the mother liquor. As a result of the water addition, crystals of triethylene diamine hydrate, predominantly the monohydrate, are formed in the mixture. The crystalline hydrate is readily recoverable by filtration.

Alternatively, the mother liquor may first be diluted with a light aliphatic hydrocarbon, such as pentane, so as to thin the mother liquor and facilitate the separation of the hydrate crystals. The pentane is added in substantial amount, such as an amount sufficient to form a 50–50 solution. Water, in very small amount compared to the hydrocarbon diluent, is then added to the solution, resulting in the formation of the hydrate without attendant formation of any aqueous layer. The addition of any moderate amount of water above the triethylene diamine/water hydrate ratio, however, will cause separation of an aqueous layer in which triethylene diamine hydrate crystals appear and grow. The crystals soon separate from this second layer and are readily recoverable by filtration. Any remaining aqueous layer may then be separated from the solution and be used in the treatment of a subsequent portion of mother liquor.

Thereafter, the remaining layer of solvent and mother liquor may be subjected to fractional distillation in order to recover the reusable solvent, and possibly to obtain additional values from the mixture.

For a clearer understanding of the invention, reference may be had to the following examples and the accompanying explanation of experimental data, together with the single figure of drawing comprising a three-component diagram.

While the method of the invention has been expressed as being applicable to the recovery of triethylene diamine from a solution which has been referred to as a mother liquor, it is obvious that the invention is of broader application and may be employed for the recovery of triethylene diamine from other solutions containing the desired product in an amount which would make its recovery practicable. For example, it is contemplated that partial recovery of triethylene diamine from the mother liquor may be obtained by redistillation at an average reflux ratio of about 3:1. After crystallization and separation of triethylene diamine from a 160–195° C. cut, the second pass mother liquor is subjected to the aforementioned treatment for hydrate production.

The recovered triethylene diamine hydrate can be used as such, or may be dissolved in an additional amount of water to form an aqueous solution. Or, if desired, the hydrate may be dehydrated either by distillation in the presence of a water-immiscible solvent, such as benzene, or by other suitable known means.

The following examples demonstrate the effectiveness of treatment in accordance with the present invention.

EXAMPLE I

In a batch operation, at room temperature, 3332 g. of mother liquor, containing 918 g. (27.3 wt. percent) of triethylene diamine, were mixed with 267 g. (8.0 wt. percent) of water, making a total weight of 3599 g. This corresponds to 15 mols of water and 8.2 mols of triethylene diamine. Upon addition of the water, there was an immediate temperature rise of 13.5° C. In less than an hour, the precipitation of triethylene diamine monohydrate was complete, and the contents of the vessel were removed at a temperature of about 28° C. Filtration of the contents produced 3036 g. of filtrate and 525 g. of wet precipitate, for a total of 3561 g. The wet precipitate was then washed with 1425 ml. of pentane, and 452 g. of washed precipitate or hydrate were recovered. This material comprised 344 g. (76 wt. percent of triethylene diamine. Since 918 g. of triethylene diamine were present in the original mother liquor, the percentage recovery of triethylene diamine was 344/918, or 37.8%.

EXAMPLE II

In a batch operation at room temperature, second pass mother liquor was processed to recover triethylene diamine. Second pass mother liquor is the liquid product recovered from the crystallization of triethylene diamine from a refractionated and reconcentrated mother liquor. When triethylene diamine is crystallized directly (rather than as the hydrate) the residual mother liquor is amenable to further processing by hydrate formation. However, when triethylene diamine has been recovered as the hydrate, the residual liquid requires reconcentration before processing. In this operation, 3122 g. of second pass mother liquor (from the direct crystallization of triethylene diamine) containing 680 g. (21.8 wt. percent) of triethylene diamine, were mixed with 234 g. (7.5 wt. percent) of water, making a total of 3356 g. This caused an immediate temperature rise of 13.8° C.

In less than an hour, the precipitation of triethylene diamine monohydrate was complete and the contents of the reactor vessel were removed at a temperature of about 24° C. Filtration of the contents produced 3035 g. of filtrate and 290 g. of wet precipitate, for a total of 3325 g. The wet precipitate was then washed with 850 milliliters of pentane, and 243 g. of washed precipitate or hydrate containing 200 g. (82.5 wt. percent) of triethylene diamine were recovered. Since 680 g. of triethylene diamine were present in the second pass mother liquor, the percentage recovery of triethylene diamine was 200/680, or 29.5 wt. percent.

Five samples of triethylene diamine hydrate obtained from operations as set forth in the foregoing examples were then subjected to appropriate and known methods of analysis and testing for the purpose of determining the triethylene diamine and/or water content. Table I indicates the results of such analysis, as follows:

Table I

| | Method | Samples | | | | |
|---|---|---|---|---|---|---|
| | | 1 | 2 | 3 | 4 | 5 |
| Wt. Percent of Triethylene Diamine. | Mass Spectrometer. | 82.4 | 87.3 | | 84.5 | 88.7 |
| | Mass Spectrometer. | | | | 13.6 | 10.6 |
| Wt. Percent of Water. | Karl Fisher Method. | 15.6 | 11.7 | | | 14.9 |
| | Benzene Azeotropic. | | | ¹16.4 | | |

¹ Sample used was a blend of several samples.
Samples 4 and 5 were a mother liquor and a second-pass mother liquor, respectively.

Mostly the monohydrate is formed, but occasionally this is not substantiated by analysis, the crystals appearing to contain less triethylene diamine than corresponds to this hydrate (86.2 wt. percent), probably because of adhesion of water to or hygroscopicity of the crystals.

Further mass spectrometer analysis of the foregoing samples failed to show any appreciable quantity of impurity in the tiethylene diamine hydrate, from which fact it appeared probable that the precipitate formed by the water addition predominantly comprised the monohydrate, containing 13.8% water.

In order to gain more information on the triethylenediamine-water system, synthetic mixtures were made up and their freezing range determined. The temperature of incipient crystallization and complete solidification indicated the existence of a hydrate in the neighborhood of 85% triethylene diamine (monohydrate), but not near 75% (dihydrate). These measurements were supplemented with the determination of cooling curves of molten $H_2O$ mixtures which gave essentially the same results as the measurements above. The hydrate formed was thereby quite clearly defined as the monohydrate.

It was observed, as a result of these laboratory tests, that the amount of the triethylene diamine hydrate precipitated from a solution containing triethylene diamine, such as a mother liquor, is relatively independent of the percentage of water used, within a certain range, but that no precipitate is formed if the amount of water added exceeds a certain value. When the quantitative data on the mother liquor triethylene diamine water samples studies in freezing range and melting point experiments were plotted on a three-component diagram, a complete and satisfactory explanation for the system was found. The three-component diagram shown in Fig. 1 is interpreted as follows:

The three components represented at the apices are the principal product, triethylene diamine (P), water (W), and a liquid menstrum (L) of mixed amines (mother liquor less product P).

The three points representnig principal compositions are a typical mother liquor (M) comprising 27 wt. percent of P dissolved in L (this represents a saturated mother liquor at 27° C. having the composition given in Example I), the crystalline hydrate (H) formed on separating P from L in the presence of W in accordance with the invention and having 13.8 wt. percent water to 86.2 wt. percent triethylene diamine, and the saturated solution (S) of P in W (37 wt. percent triethylene diamine in water at 27° C.).

The line MNQS represents the border line between an upper two-phase region and a lower one-phase region. The addition of increasing amounts of water W to the typical mother liquor M would be represented by a point moving along the straight line from M to W. It is apparent from the drawing that a two-phase system (solid hydrate plus mother liquor) cannot exist in the presence of a water concentration above about 19 wt. percent, i.e., beyond the point Q common to the MW and the MNQS lines. At points between M and Q, a two-phase system exists. The two components separated at equilibrium comprise a residual liquor depleted of product hydrate and crystalline monohydrate. For example, if 7 wt. percent water is added to the mother liquor M, the system is approximately at the point O in the two phase region. It separates into two components, namely, the solid crystalline monohydrate of triethylene diamine (H) and a saturated solution of residual amino compounds (N) comprising mother liquor (of lower P content) and water. The amounts of these products are inversely proportional to the segments of tie line N—O—H, i.e.,:

$$\frac{\text{Solid product hydrate}}{\text{Liquid product}} = \frac{ON}{OH}$$

Mother liquors having a lower content of triethylene diamine will be represented by another point along the P—L line closer to L from which liquors a correspondingly smaller amount of hydrate can be recovered by crystallization. At lower temperatures the same process of crystal hydrate formation yields larger quantities of solid product, or, on Fig. 1, the area MNQ under the line M—Q is increased. At 27° C., of Example I and Fig. 1, the recovery of product hydrate amounts to 36–38 wt. percent of the triethylene diamine present in the mother liquor. Additional cooling to 5° C. produces an additional yield of hydrate crystals amounting to 11–16 wt. percent of the triethylene diamine present. With an overall recovery of about 50–55 wt. percent of the triethylene diamine present in the mother liquor at 5° C., it is evident that, for practical purposes, a mother liquor should contain at least about 13 wt. percent of triethylene diamine to be suitable for processing.

In some cases, the mother liquor is dark and viscid, making the separation of clean crystals therefrom rather difficult. In such case, the mother liquor may be diluted with a light non-viscous hydrocarbon, such as pentane. Pentane addition not only permits easier separation of triethylene diamine hydrate crystals from the concentrate, but also gives an improved yield of triethylene diamine, as shown by the following data exemplifying the effectiveness of treatment with and without the addition of pentane to the mother liquor prior to the addition of water.

Table II

The charge consisted of 200 g. of mother liquor, containing 27.2% triethylene diamine. Triethylene diamine hydrate was crystallized at 5° C., using graded amounts of water, with and without pentane. In each instance, the hydrate crystals were washed with 150–225 ml. of pentane, weighed and analyzed.

| Run No. | Pentane Weight Percent | Water Weight Percent | Weight Percent Triethylene Diamine | |
|---|---|---|---|---|
| | | | In Hydrate | Recovered From Total in Mother Liquor |
| 1 | | 10 | 75.4 | 48.8 |
| 2 | 62 | 10 | 64.3 | 54.2 |
| 3 | | 8 | 76.6 | 51.0 |
| 4 | 62 | 8 | 74.0 | 55.7 |

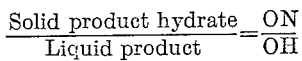

From the foregoing data it will be noted that while the purity of the triethylene diamine is slightly less with pentane present, the wt. percent recovered from the total present in the mother liquor is greater.

With the 8–10 wt. percent water addition, the hydrate crystals remained somewhat moist, which is reflected in the lower triethylene diamine content of the crystalline hydrate.

When pentane is used in the crystallization of hydrate or in washing separated hydrate crystals to remove adherent mother liquor, it is preferred, though not required, to use pentane presaturated with triethylene diamine and/or its hydrate. The solubility of triethylene diamine in pentane is quite appreciable, but the hydrate is only slightly soluble in pentane. The solubility of triethylene diamine in the n-pentane was experimentally determined by saturating quantities of pentane with triethylene diamine at various temperatures between 4 and 28° C. The content of the saturated solution was then determined by the evaporation method and by chemical analysis. The results are given below:

Table III

| Saturate Formed at (°C.) | Triethylene Diamine Content | |
|---|---|---|
| | Evap. Method (Wt. Percent) | Chem. Analysis (Wt. Percent) |
| 4 | | 3.5 |
| 6 | 4.3 | |
| 8 | 4.7 | |
| 28 | 7.1–7.9 | 7.3 |

In the process of the present invention, where pentane or a similar light hydrocarbon solvent is used, it is advantageous to use such solvent in essentially a countercurrent manner, first to wash hydrate or anhydrous product crystals in their final processing step, then to earlier crystal washing steps, and ultimately, where so desired, for dilution of mother liquor in the initial formation of triethylene diamine hydrate crystals, etc.

By the method of this invention, substantial additional recovery of triethylene diamine from a mother liquor or a second pass mother liquor may be effected by formation of and subsequent recovery from the hydrate. The hydrate may be used as such or may be dissolved in an additional amount of water to form an aqueous solution. In certain cases, it may be desirable to dehydrate the crystals, as by distillation in the presence of a water immiscible solvent, such as benzene, or by other suitable means.

The present invention is of particular advantage as applied to a process for the production of triethylene diamine from a charge comprising diethylene triamine.

Since a present commercial practice of obtaining triethylene diamine from such charge by distillation and subsequent crystallization from a distillation cut boiling in the range of 160–195° C. generally results in a recovery of about 55% or more of the triethylene diamine produced, an economical method for recovering additional triethylene diamine has definite commercial advantages.

The mother liquor obtained from the original crystallization and separation step may be redistilled, in which case the triethylene diamine recovery may be increased to about 77.5%, and the second pass mother liquor may then be treated with water or water and pentane to produce the hydrate. Or, the mother liquor may be treated directly for hydrate production. In either case, recovery of triethylene diamine from the hydrate may increase the overall recovery to about 80–85%.

While, in the examples given, n-pentane was used as the solvent to be added to the triethylene diamine mixture along with the small amount of water, the invention is not so limited. It is contemplated that other aliphatic hydrocarbons boiling at a temperature of below 150° C., such as hexane, heptane, etc., may be employed. A primary consideration in the selection of a hydrocarbon solvent would be the ease of its subsequent recovery from the solution.

The method of the present invention finds application also to the purification of amines, such as triethylene diamine and certain solid homologues or analogues thereof, as well as to piperazine.

To effect such purification, discolored or impure triethylene diamine is first dissolved in a solvent which is immiscible with water, such as benzene, for example. If decolorization is to be included in the purification treatment, the solution is then treated with known decolorizing agents, such as charcoal, activated carbon, etc.

The triethylene diamine is then precipitated from the solution in the form of its hydrate by the addition of a relatively small amount of water, as described herein, the quantity of which may be about 2 mols per mol of triethylene diamine.

If anhydrous triethylene diamine is required as the final product, the water from the hydrate may be removed by boiling the hydrate with a suitable azeotropic agent, such as benzene, or by some suitable drying procedure applied at reduced pressure.

Obviously many modifications and variations of the invention as heerinbefore set forth may be made without departing from the spirit and scope thereof, and therefore only such limitations should be imposed as are indicated in the appended claims.

What is claimed is:

1. The method for the separation and recovery of diazabicyclo-octane from liquid mixtures containing in addition to diazabicyclo-octane, compounds boiling in the range of about 160–195° C. and formed as by-products in the catalytic vapor phase production of diazabicyclo-octane from an alkylene polyamine, which method comprises the steps of adding to said mixture about 3–10 wt. percent of water to thereby form a hydrate of diazabicyclo-octane, and recovering by filtration the crystalline hydrate.

2. The method as in claim 1 in which said water is added to said mixture in a preferred range of 4.0–7.5 wt. percent.

3. The method as in claim 1, including the step of adding to said liquid mixture along with said water about 50–65 wt. percent of an aliphatic hydrocarbon having a boiling point under about 150° C.

4. The method as in claim 3 in which said hydrocarbon comprises n-pentane.

5. The method as in claim 1 in which said hydrate formation is promoted by cooling said mixture to about 5° C.

6. The method of recovering diazabicyclo-octane from reaction mixtures obtained by vapor phase catalytic conversion of an alkylene polyamine which comprises initially separating from the reaction product a crude distillate fraction boiling in the range of about 160–195° C., crystallizing a major portion of the diazabicyclo-octane content from said fraction by cooling, and treating the resulting mother liquor mixture by adding thereto about 3–10 wt. percent of water to thereby form a hydrate of diazabicyclo-octane, and recovering by filtration the crystalline hydrate.

7. In a process for the separation and recovery of diazabicyclo-octane from reaction products containing the same in the amount of about 45–55 wt. percent, wherein the major portion of said diazabicyclo-octane is initially recovered by crystallization from a distillate cut boiling in the range of about 160–195° C., leaving a residual fraction of mother liquor containing about 18–28 wt. percent of diazabicyclo-octane, the method for effecting additional recovery of diazabicyclo-octane from said mother liquor which comprises the steps of: adding to said mother liquor about 3–10 wt. percent of water to thereby form a hydrate of diazabicyclo-octane, and recovering by filtration the crystalline hydrate.

References Cited in the file of this patent
UNITED STATES PATENTS
2,810,676   Hadler et al. _____ Oct. 22, 1957